Feb. 7, 1950   J. E. FRAGALE   2,496,623
TWO-STROKE CYCLE INTERNAL-COMBUSTION ENGINE
Filed April 18, 1947
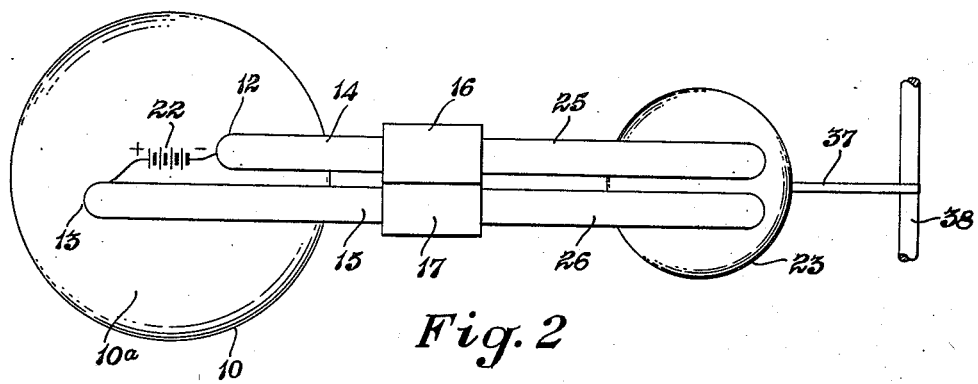
Fig. 2
Fig. 1
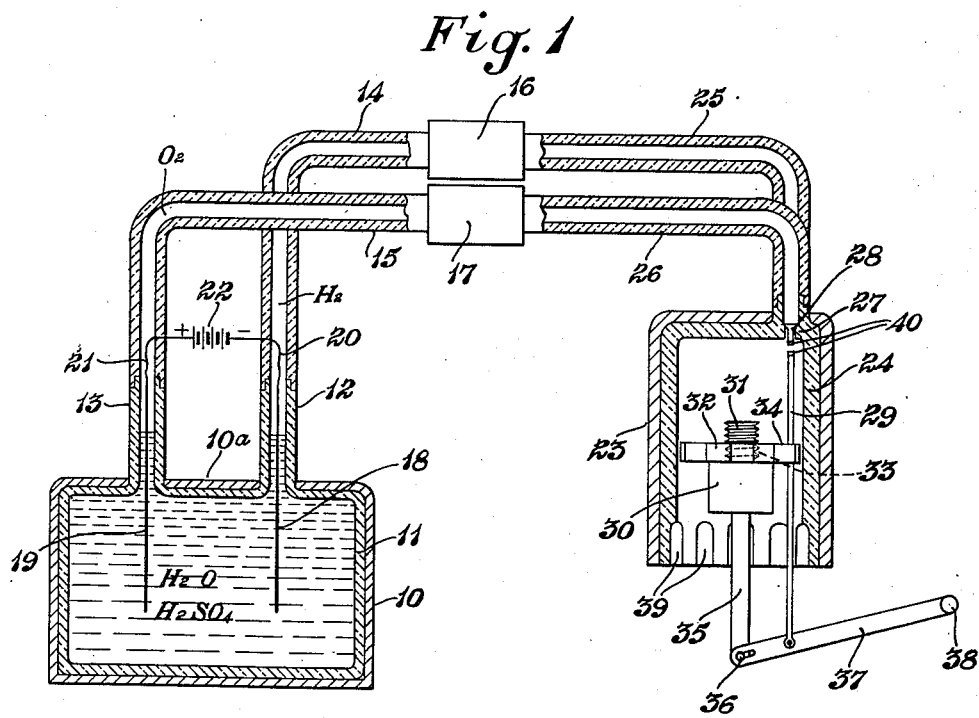
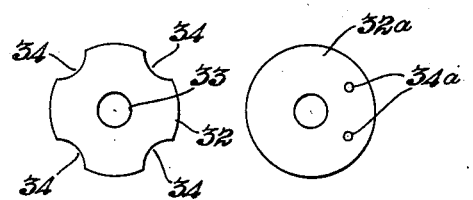
Fig. 3   Fig. 4
Inventor
John E. Fragale
By 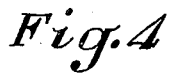
Attorneys Patented Feb. 7, 1950

2,496,623

UNITED STATES PATENT OFFICE 2,496,623

TWO-STROKE CYCLE INTERNAL-COMBUSTION ENGINE

John E. Fragale, Wooster, Ohio

Application April 18, 1947, Serial No. 742,220

4 Claims. (Cl. 123—65)

The invention relates to engines and more particularly to an engine employing water to produce the power to operate the engine.

It is an object of the invention to provide an engine in combination with means for breaking water up into hydrogen and oxygen, removing the two gases separately, compressing the gases and injecting them into the cylinder of an engine where they combine and explode producing power to operate the engine.

Another object is to provide such an apparatus including a tank filled with a solution of water ($H_2O$) and sulphuric acid ($H_2SO_4$), said tank having two spaced, upright tubes connected thereto, a cathode being located in one tube and an anode in the other, connected to opposite sides of an electric battery or other suitable source of electric energy, whereby the solution will be broken up into $H_2$ (hydrogen) and $O_2$ (oxygen) molecules which are separately carried off through the tubes.

A further object is to provide an apparatus of the character referred to in which the solution level in the tank extends up into the two outlet tubes whereby the hydrogen and oxygen will be prevented from uniting before they are injected with the engine cylinder.

A still further object is to provide such an engine in which the piston is provided with a ring which is longitudinally slotted or perforated to permit the water, formed by the combining of the hydrogen and oxygen, to pass down the walls of the cylinder to lubricate the engine.

Another object of the invention is to provide such an engine in which the lower portion of the internal walls of the cylinder are longitudinally grooved to facilitate the discharge of the water therefrom.

The above objects together with others which may be later referred to or which will be apparent from the drawings and following description may be attained by constructing and operating the apparatus in the manner hereinafter described in detail and illustrated in the accompanying drawings in which:

Figure 1 is a diagrammatic, vertical sectional view of an apparatus embodying the invention;

Fig. 2 is a top plan view of the same;

Fig. 3 is a detached plan view of the piston ring; and,

Fig. 4 a similar view of a modified form of ring.

In carrying out the invention an apparatus is provided such as shown in the drawing, and including a tank 10 which for the purpose of the invention may be made of glass, or as shown in the drawing the tank may be made of steel or other suitable material lined with glass as indicated at 11.

Upright tubes 12 and 13 are connected to, or formed integrally with the top wall 10a of the tank and may have the extensions 14 and 15 respectively, connected to their upper ends and leading to the separate compressors shown diagrammatically at 16 and 17 respectively.

A cathode 18 is located within the tube 12 and extends downward into the tank 10, and an anode 19 is similarly located within the tube 13, extending down into the tank. The cathode 18 and anode 19 are connected, by the wires 20 and 21 respectively to the negative and positive sides respectively of an electric battery 22 or equivalent source of electrical energy.

The engine may comprise a cylinder as indicated at 23, or if desired a plurality of such cylinders, which may be formed of glass or other suitable material, or as shown in the drawing, may be lined with glass or the like as indicated at 24 in Fig. 1.

Tubes 25 and 26 respectively connect the compressors 16 and 17 with the top of the cylinder 23 through the identical ports 27, one of which is shown in Fig. 1 at the point of communication between the tube 26 and the top of the cylinder.

A valve 28 controls each inlet port and each valve is arranged to be operated by an identical rod 29, one of which is shown in Fig. 1. Within the cylinder is located the piston 30 which may be formed of glass and which is preferably of considerably less diameter than the bore of the cylinder, and provided at its upper end with the reduced, screw threaded extremity 31 upon which the ring 32 may be mounted as by the internally threaded, central aperture 33.

As shown in Figs. 1 and 3 the glass ring 32 may be provided with the peripheral grooves 34, through two of which the rods 29 may be accommodated, or as shown in Fig. 4, the modified form of ring 32a may be provided with apertures 34a through which the rods may operate.

The piston rod 35 connects the piston to a rocker shaft or other power take off means, preferably in the manner shown in Fig. 1, where the lower end of the piston rod is pivotally connected as at 36 to the rocker arm 37, which is journalled to oscillate upon the axis 38.

Any conventional crank shaft or other power shaft may be operatively connected to the rocker shaft 37 for transmitting power from the engine to any device to be operated thereby. The piston rod 35 is preferably rigidly connected to the piston to prevent any possibility of bumping against the cylinder during operation of the engine.

If desired the lower, inner walls of the cylinder may be grooved, as shown at 39 in Fig. 1, to facilitate drainage of water from the interior of the cylinder.

In the operation of the apparatus, a solution of water ($H_2O$) and sulphuric acid ($H_2SO_4$) is placed in the tank filling the same and extending up for some distance into the tubes 12 and 13. The battery 22 supplies electrons to the cathode 18, the current of the battery passing through the cathode into the solution in the tank. The chemical reaction which takes place causes the $H_2O$ to break up into $H_2$ and $O_2$, the sulphuric acid acting as a catalyst.

$H_2$ atoms and molecules escape by way of the cathode 18, through the tube 12—14 to compressor 16, and $O_2$ atoms and molecules escape by way of the anode 19, through the tube 13—15 to the compressor 17.

These compressors may be of any conventional design, and compress the hydrogen and oxygen separately and discharge them separately through the tubes 25 and 26 from which they are injected into the cylinder when the valves 28 are opened on the upstroke of the piston and rods 29.

As the hydrogen and oxygen come into contact in the upper portion of the cylinder they produce an explosion, driving the piston down and operating the rocker shaft 37 and the power take off means which may be connected thereto.

At the time the hydrogen and oxygen unite in the top of the cylinder they form water ($H_2O$) which will drain down through the grooves 34, or apertures 34a of the piston ring and out of the lower end of the cylinder, the grooves 39 therein facilitating the escape of the water therefrom.

The valves 28 close on the down stroke of the piston, and rods 29, and again upon the upstroke the valves are opened, permitting the hydrogen and oxygen from the compressors to be again injected into the cylinder and repeating the operation as above described.

If desired, rubber bumpers 40 may be provided upon the opposed ends of the valves 28 and rods 29, to eliminate noise in the operation of the engine.

I claim:

1. An engine adapted to be operated by oxygen and hydrogen, said engine comprising a cylinder closed at its upper end and open at its lower end, the lower end of the interior of the cylinder being longitudinally grooved, a glass surface on the interior of the cylinder, a spaced pair of inlet ports in the upper end of the cylinder, valves in said ports, a glass piston within the cylinder, and means including push rods slidably located through the piston for opening the valves on each upstroke of the piston.

2. An engine adapted to be operated by oxygen and hydrogen, said engine comprising a cylinder closed at its upper end and open at its lower end, a glass surface on the interior of the cylinder, a spaced pair of inlet ports in the upper end of the cylinder, valves in said ports, a piston within the cylinder of considerably less diameter than the cylinder, a reduced threaded upper end upon the piston, a glass ring of substantially the diameter of the cylinder mounted upon said threaded end of the piston, and means for opening the valves on each upstroke of the piston.

3. An engine adapted to be operated by oxygen and hydrogen, said engine comprising a cylinder closed at its upper end and open at its lower end, the lower end of the interior of the cylinder being longitudinally grooved, a glass surface on the interior of the cylinder, a spaced pair of inlet ports in the upper end of the cylinder, valves in said ports, a piston within the cylinder of considerably less diameter than the cylinder, a reduced threaded upper end upon the piston, a glass ring of substantially the diameter of the cylinder mounted upon said threaded end of the piston, and means for opening the valves on each upstroke of the piston.

4. An engine adapted to be operated by oxygen and hydrogen, said engine comprising a cylinder closed at its upper end and open at its lower end, the lower end of the interior of the cylinder being longitudinally grooved, a glass surface on the interior of the cylinder, a spaced pair of inlet ports in the upper end of the cylinder, valves in said ports, a piston within the cylinder of considerably less diameter than the cylinder, a reduced threaded upper end upon the piston, a glass ring of substantially the diameter of the cylinder mounted upon said threaded end of the piston, and means including push rods slidably located through said ring for opening the valves on each upstroke of the piston.

JOHN E. FRAGALE.

REFERENCES CITED

The following references are of record in the file of this patent:

UNITED STATES PATENTS

| Number | Name | Date |
|---|---|---|
| 765,159 | Aslakson | July 19, 1904 |
| 1,214,858 | Wilkin | Feb. 6, 1917 |
| 1,214,859 | Wilkin | Feb. 6, 1917 |
| 1,690,321 | Baker | Nov. 6, 1928 |
| 1,731,228 | Burtnett | Oct. 8, 1929 |

FOREIGN PATENTS

| Number | Country | Date |
|---|---|---|
| 2,024 | Great Britain | Jan. 28, 1896 |